United States Patent [19]

Konstantin

[11] 3,924,387
[45] Dec. 9, 1975

[54] BANDING MACHINE

[76] Inventor: Anatole E. Konstantin, 10 Live Oak Road, Norwalk, Conn. 06851

[22] Filed: Apr. 3, 1975

[21] Appl. No.: 564,692

[52] U.S. Cl. ..................................... 53/291; 53/297
[51] Int. Cl.² ..... B65B 7/28; B67B 5/00; B65C 3/18
[58] Field of Search ............. 53/290, 291, 292, 293, 53/294, 295, 296, 49, 297, 198 R

[56]  References Cited
UNITED STATES PATENTS

| | | | |
|---|---|---|---|
| 1,252,460 | 1/1918 | Linderme | 53/292 X |
| 2,765,607 | 10/1956 | Aguilar et al. | 53/291 |
| 2,835,088 | 5/1958 | Eddison et al. | 53/291 X |

*Primary Examiner*—Travis S. McGehee
*Assistant Examiner*—Horace M. Culver

[57]         ABSTRACT

Apparatus for accurately placing a band of shrinkable plastic film over an article, comprising (1) means for dispensing flattened shrinkable plastic tubing, (2) means for opening a section of said tubing and for reflattening the opened tubing in a plane perpendicular to the first plane, (3) means for feeding a length of said reflattened tubing into position for being cut, (4) means for cutting said preselected length of reflattened tubing into bands, (5) means for moving said bands into vertical alignment with an article banding station, comprising a rotatable horizontal plate provided with at least one elongated slot therein, the rearward portion of said slot being shaped such that its sides support the rear hemispherical half of the band in a vertical open position, whereby when the reflattened tubing, which extends through said slot, is cut, the band will spring open in said slot and be held slightly compressed by the sides of the slot, (6) band stopping means, in vertical alignment with said article banding station, shaped such that its concave inner surface supports the front hemispherical half of the band in a vertical open position, whereby on mating with the rearward portion of said slot, a collar surrounding said band is formed which holds the band in an open position, in vertical alingnment with the article banding station, and (7) means for pushing the opened band through said collar and over said article.

10 Claims, 6 Drawing Figures

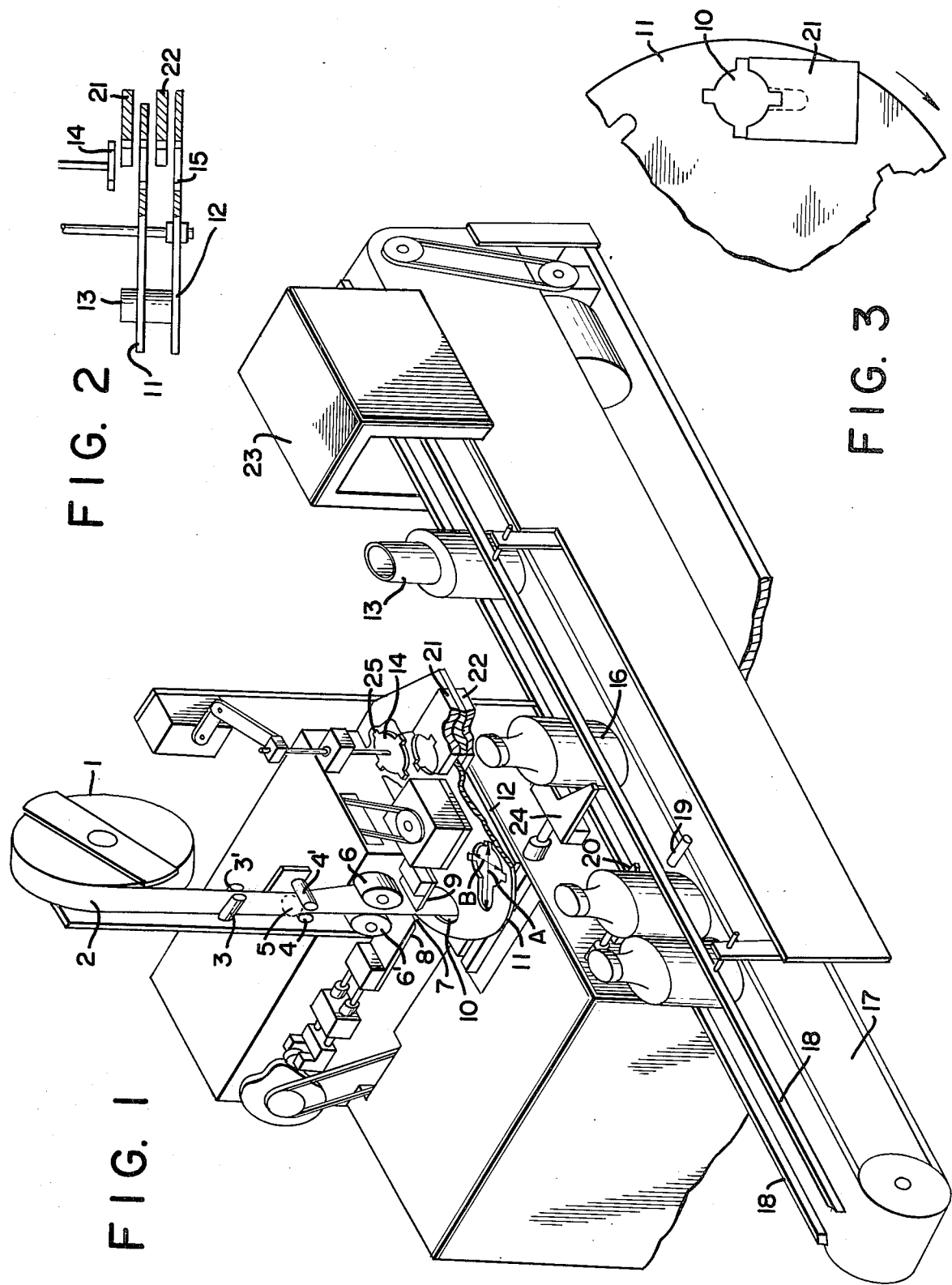

BANDING MACHINE

BACKGROUND

This invention relates to apparatus for accurately placing a band of shrinkable plastic film over an article, such as, for example, a bottle or other container. After the band has been placed over the article, it is shrunk to fit tightly around the article.

The use of plastic neck bands of shrinkable plastic film for sealing bottles of medicine, toiletries, foodstuff and beverages is well known. In addition to serving as tamper proof or secondary seals, such bands may also be used to fasten two or more articles together or to fasten a label on to an article or container. The bands may be made of any suitable transparent or opaque plastic film which can be shrunk to form a tight fitting seal around the neck and cap or body of the container. Although films which shrink upon coming in contact with moisture are known, the preferred materials are heat shrinkable films of polyolefin or polyvinylchloride (PVC) which exhibit 50 percent shrinkage at 275°F and 325°F, respectively.

Machines for placing bands of shrinkable film over the necks of bottles are also known. Conventionally, such machines include a conveyor which carries the bottles to the banding station. There the banding machine places a heat shrinkable band over the neck of the bottle, after which the conveyor carries the bottle through a tunnel heater which causes the film to shrink tightly around the neck and cap of the bottle. Such banding machines should be able to place the bands on each bottle accurately, and at a rate of at least 60 seals per minute in order to keep pace with filling operations. However, prior art machines tend too frequently to jam or to place the bands in an inaccurate manner, requiring constant operator supervision and adjustment to be certain that each bottle is properly sealed. It is readily apparent that shut down of the banding machine for even a relatively short period of time will cause substantial disruption of continuous automatic filling and packaging operations. Furthermore, since shrink-tubing, from which the individual bands are cut, is normally supplied in coils of flattened tubing crimped at the two edges, a persistent problem in the prior art has been to keep the bands open and properly aligned with the container over which it is to be placed.

It is therefore an object of this invention to provide a machine or apparatus for dependably and accurately placing bands of shrinkable film over a container.

SUMMARY OF THE INVENTION

The above and other objects, which will be apparent to those skilled in the art, are achieved by the present invention, which comprises:

apparatus for accurately placing a band of shrinkable plastic film over an article, such as a container, comprising in combination:

1. means for dispensing shrinkable plastic tubing, flattened in a first plane and having crimped edges,
2. means for opening a section of said flattened tubing and for reflattening the opened tubing in a plane perpendicular to said first plane without crimping its new edges,
3. means for feeding a preselected length of said reflattened tubing into position for being cut,
4. means for cutting said preselected length of reflattened tubing into bands,
5. means for moving said bands into vertical alignment with an article banding station, said moving means comprising a rotatable horizontally disposed plate having at least one elongated slot, extending through said plate, said slot having perpendicular major and minor axes, the rearward portion of said slot being shaped such that its sides support the rear hemispherical half of the band in a vertical position, said minor axis being approximately equal in length to the outside diameter of said tubing, whereby when the reflattened tubing — which extends through said slot and lies in the plane parallel to major axis — is cut, the band will spring open in said slot with the edges of the band being slightly compressed by the sides of the slot,
6. band stopping means, located in vertical alignment with said article banding station, said means being shaped such that its concave inner surface supports the front hemispherical half of the band in a vertical position, whereby on mating with the rearward portion of said slot, a collar surrounding said band is formed which holds the band in an open position, in vertical alignment with the article banding station, and
7. means vertically aligned with said article banding station for pushing the opened band through said collar and over said article.

Preferably, said apparatus also comprises means for supporting said band on its bottom face, while being moved into alignment with said article banding station, comprising a fixed plate disposed horizontally beneath said rotatable plate and provided with an aperture therethrough, in vertical alignment with said article banding station, for allowing said open band to pass through it.

It is preferred that both the rearward portion of the slots in the rotating plate and the band stopping means be semi-circular in shape, so that on mating, these two elements form a circular collar or orifice which surrounds the band, keeping it open and aligned over the article at the banding station. The preferred shape of the aperture in the support plate is likewise circular.

During operation, the apparatus described above is used in cooperation with means for conveying the articles or containers first to their banding position, and after they have been banded to means for shrinking said band.

THE DRAWINGS

FIG. 1 is a perspective view, partially sectioned, illustrating a preferred embodiment of the present invention.

FIG. 2 is an enlarged side view in cross-section of the banding station assembly shown in FIG. 1.

FIG. 3 is a top view of the banding station, illustrating the mating of the stop and the slot to form a circular positioning collar.

DETAILED DESCRIPTION

Figure 4:
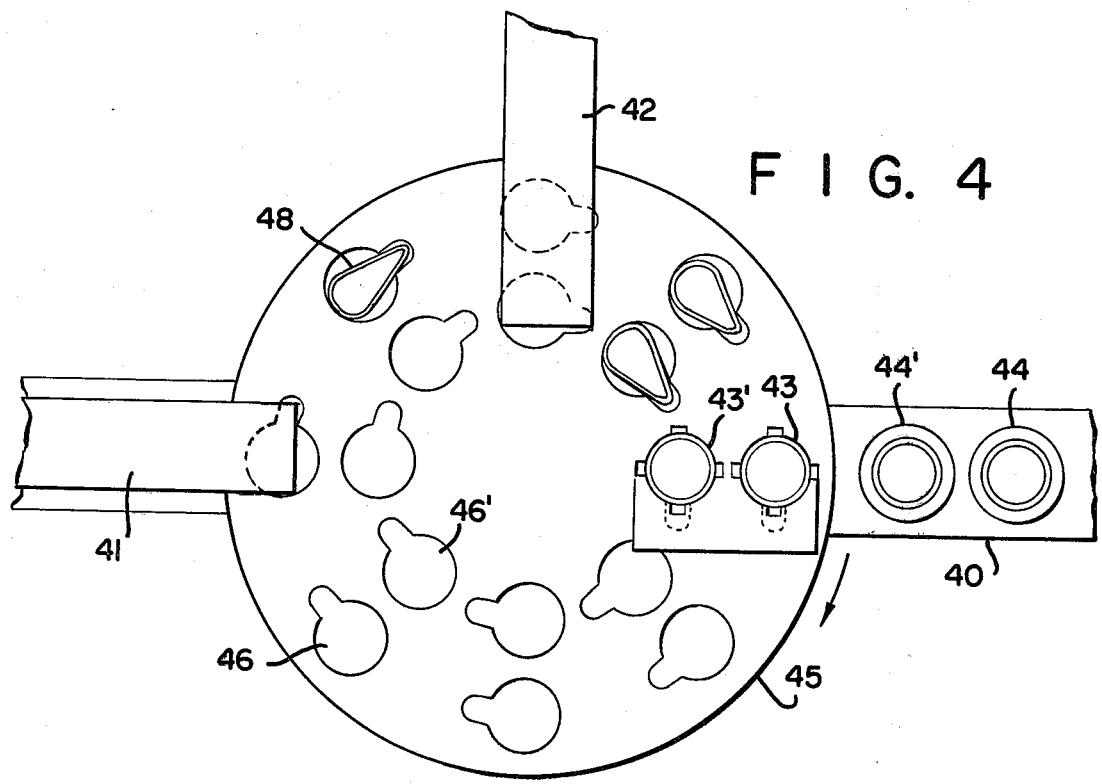
FIG. 4 is a top view of an other preferred embodiment of the present invention, illustrating the rotating plate of a double acting banding machine.

In order to gain a better understanding of the present invention, reference is made to the drawings. FIG. 1 illustrates a banding machine made in accordance with the present invention. Dispenser 1 contains a coil of flattened PVC tubing 2 which is threaded first through a pair of guide rollers 3 and 3', and then through a tubing opener, consisting of a pair of parallel rollers 4 and 4' mounted so that the space between the rollers lies in a plane perpendicular to the plane in which the originally flattened tubing 2 lies. A ball 5, placed inside tubing 2, rests on rollers 4 and 4'. Tubing 2 is reflattened by rollers 4 and 4' to lie in the plane perpendicular to its original or first plane. The tubing is now threaded through the parallel, driven feed rollers 6 and 6' which are narrower in width than the reflattened width of the tubing so as not to cause a second set of permanent crimps to be made in the edges of the reflattened tubing. If one desires to have the bands perforated in their axial direction, this can be accomplished by having one or more circular perforating knives (not shown) mounted on the same axel as roller 6 or 6' to cut perforations into the tube. Such performations serve to make the band more easily removable from the container. An alternative to using a perforating knife is to use preperforated tubing. Rollers 6 and 6' feed the reflattened tubing through the cutting slit 7 which consists of a driven knife edged blade 8 and a stationary mating blade 9. Tubing 2 is next threaded through slot 10 in rotating plate 11 until its front edge is just short of contacting the stationary plate 12 for clearance purposes. Tubing 2 is severed by blades 8 and 9 into a band 13 which springs open inside slot 10 and drops to rest on plate 12. Rotation of plate 11 causes band 13 to be moved into alignment with the banding station consisting of plunger 14, band shaping stops 21 and 22.

The above described apparatus operates in the following manner. A plurality of articles, for example bottles 16 are placed on the continuous motor driven belt conveyor 17. The conveyor is provided with guide bars 18 which prevent the bottles from falling off the conveyor as well as keeping them centered. As a bottle reaches the tripping mechanism 19, which may be a pneumatic or photocell sensor, a sequence of timed operations is actuated and carried out automatically by the machine. Arm 20, which holds back the bottles 16 is retracted, permitting one bottle to be released and moved by the conveyor belt. The feed rollers 6 and 6' advance a segment of tubing 2 through cutting slit 7 and slot 10. Blade 8 is driven forward to cut the segment of tubing 2 into a band 13, which springs open in slot 10 having a major axis A and a minor axis B. Band 13 is held open, since the originally crimped edges of the band will be slightly compressed by the forward portion of the slot which is narrower than the outside diameter of the band, and consequently smaller than the flattened width of the band which was inserted into the elongated slot 10 parallel to its major axis A. Band 13 is rotated into axial alignment with the banding station by rotating plate 11. Meanwhile the conveyor belt has moved bottle 16 to the banding station, where it is held in place by the extended gripper arm 24. In order to insure proper vertical alignment of band 13 with the circular aperture 15 through which plunger 14 will push the band over the cap and neck of the bottle, the semi-circular stops 21 and 22, located above and below plate 11, force the band into circular shape by forming a circular collar around it as they mate with the semi-circular rearward portion of slot 10. The manner in which this takes place can be seen more clearly in FIGS. 2 and 3. Band 13 is then pushed down by plunger 14 as far as desired, in the instant case, until it comes to rest on the shoulders of the bottle, after which the plunger 14 and then the gripper arm 24 are retracted, and the bottle is moved forward by conveyor 17 through a conventional heating tunnel 23. The heat in the tunnel is maintained at a temperature sufficient to cause the band to shrink tightly around the neck and cap of the bottle, thereby sealing it with the band. Proper synchronization of the above operation is necessary to insure proper continuous operation. This may be accomplished through conventional timing switches, relays and mechanical linkages.

The apparatus of the present invention can be adjusted to handle containers of different shape and size simply by replacing the band orifice assembly — comprising the rotating and stationary plates 11 and 12, the plunger 14, and the stops 21 and 22 with another such assembly appropriately sized for banding a different sized shrinkband.

The present apparatus described above is capable of accurately and reliably banding containers at rates as high as 120 containers per minute.

The four tabs or fingers 25 which extend out around the edges of plunger disc 14 insure that the band 13 will be caught by the disc and pushed through the collar formed by slot 10, stops 21 and 22, as well as through aperture 15 without jamming. Without such tabs, the band which is made of thin film can easily be jammed or squeezed between the edge of disc 14 and the slot or aperture. If tabs are used on the disc, properly aligned recesses for the tabs to fit through must be cut in the slots, stops and apertures.

FIG. 4 illustrates a modification of the present invention, by which the capacity of the machine may be doubled. This modification is achieved by providing two lines of banding operation per machine, consisting of two band cutting assemblies 41 and 42 and two banding stations 43 and 43', instead of one such assembly and station as shown in FIG. 1. To accomodate the two lines, the rotating plate 45 is provided with two sets of slots to move the bands from the band cutting assembly to the banding station — an outer set of slots 46 and an inner set of slots 46'. The first band cutting assembly 41 feeds bands 48 to the outer set of slots 46 which moves the bands to container banding station 43, while the second band cutting assembly 42 feeds bands to the inner set of slots 46' which move the bands to container banding station 43'. Appropriate modifications in the timing of the container release arm (not shown) is required to permit two containers at a time to be moved by the conveyor 40 into alignment with the banding stations, so that two containers 44 and 44' may be banded simultaneously.

It will be apparent to those skilled in the art that other modifications of the multi-line banding concept illustrated in FIG. 4 are also feasible. For example, instead of banding two containers at a time, three, four or more containers may be banded simultaneously, by providing additional lines of operation; each line being provided with a band cutting assembly, a banding station and a set of slots in the rotating plate. The maximum number of such additional lines is limited only by the availability of space on a single machine.

An other useful modification of the machine illustrated in FIG. 4, is to make the two lines of operation capable of banding different sized bands; e.g. one line to place a large band over the body of a bottle — for example to attach a label or a free sample packet — and the other line to place a smaller neck band over the neck and cap of the bottle.

Figure 5:
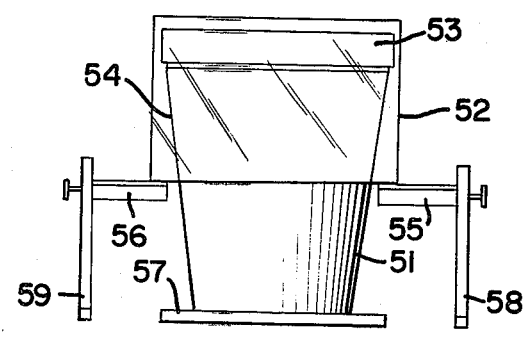
FIG. 5 illustrates the manner in which a band is applied to seal a cap on a container which has no shoulder.

FIG. 5 illustrates the manner in which the apparatus of the present invention may be utilized to place shrink bands around containers which have no shoulder for the band to rest on. Food containers, which require a large mouth, frequently have "flower pot" or conical shapes. A frusto-conical container 51 is shown in FIG. 5. In order to place a band 52 over the top 53 and neck portion 54 of container 51, two guide rails 55 and 56 are mounted parallel to the path of the conveyor belt 57. The guide rails 55 and 56 may be adjustably mounted on support members 58 and 59 at such a height that the band 52 which is slidably supported by the rails will be held at the desired height. By proper sizing of the band length and positioning of the rails, the band 52, after being shrunk to fit tightly, may be made to overlap top 53 both on its upper face and lower periphery, thereby forming a secondary, tamper proof seal.

Figure 6:
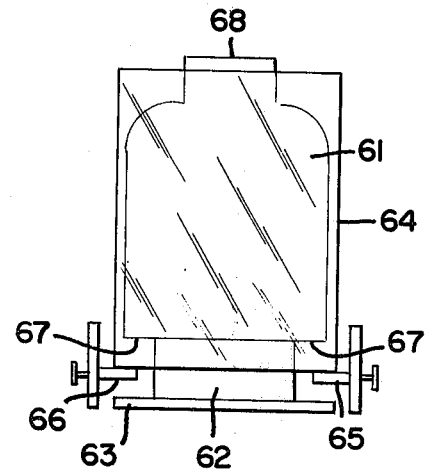
FIG. 6 illustrates the manner in which a band is applied to the sides of a container in order to encase an article in a moisture or vapor resistant plastic sleeve.

FIG. 6 illustrates the use of a band to substantially enclose an article. Such use may serve, for example, to render the article more moisture or vapor resistant. Such resistance, of course, will be dependent upon the nature of the plastic film from which the band is made, as well as the extent to which the container is encased by the band. In FIG. 6, article 61 rests on a support member 62, which in turn rests on the conveyor belt 63. Support member 62, consisting of individual supports placed under each article, raises the article off the conveyor belt 63. When the shrink band 64, held at the appropriate height by guide rails 65 and 66, is shrunk to fit tightly around article 61, the bottom end of the band will curl under the peripheral area 67 of the bottom face, while the top face 68 will be left uncovered by the shrunken band.

What is claimed is:

1. Apparatus for accurately placing a band of shrinkable plastic film over an article, comprising in combination:
   1. means for dispensing shrinkable plastic tubing, flattened in a first plane and having crimped edges,
   2. means for opening a section of said flattened tubing and for reflattening the opening tubing in a plane perpendicular to said first plane without crimping its new edges.
   3. means for feeding a preselected length of said reflattened tubing into position for being cut,
   4. means for cutting said preselected length of reflattened tubing into bands,
   5. means for moving said bands into vertical alignment with an article banding station, said moving means comprising a rotatable horizontally disposed plate having at least one elongated slot, extending through said plate, said slot having perpendicular major and minor axes, the rearward portion of said slot being shaped such that its sides support the rear hemispherical half of the band in a vertical position, said minor axis being approximately equal in length to the outside diameter of said tubing whereby when the reflattened tubing — which extends through said slot and lies in the plane parallel to major axis — is cut, the band will spring open in said slot with the edges of the band being slightly compressed by the sides of the slot,
   6. band stopping means, located in vertical alignment with said article banding station, said means being shaped such that its concave inner surface supports the front hemispherical half of the band in a vertical position, whereby on mating with the rearward portion of said slot, a collar surrounding said band is formed which holds the band in an open position, in vertical alignment with the article banding station, and
   7. means vertically aligned with said article banding station for pushing the opened band through said collar and over said article.

2. The apparatus of claim 1, including means for supporting said band on its bottom face, while being moved into alignment with said article banding station, comprising a fixed plate disposed horizontally beneath said rotatable plate and provided with an aperture therethrough, in vertical alignment with said article banding station, for allowing said open band to pass through it.

3. The apparatus of claim 1 wherein the rearward portion of said slot in said rotation plate and the shape of the band stopping means are both semi-circular, whereby on mating, said elements form a circular collar surrounding said band.

4. The apparatus of claim 2 wherein said aperture is circular in shape.

5. The apparatus of claim 2, including means for conveying said articles first to their banding station, and after being banded to means for shrinking said band.

6. The apparatus of claim 1 wherein said means for opening and reflattening said tubing comprises a pair of parallel rollers mounted such that the space between them is in a plane perpendicular to said first plane and a ball fitting inside said tubing and resting on said rollers.

7. The apparatus of claim 1 wherein said means for pushing the opened band through said collar comprises a plunger disc having a plurality of tabs extending radially outward at the edges of said disc.

8. The apparatus of claim 5, including guide rails positioned parallel to said conveying means for slidably supporting said bands at the desired height over said article while said banded articles are conveyed to said means for shrinking said bands.

9. The apparatus of claim 2, wherein the rearward portion of said slot in said rotation plate and the shape of the band stopping means are both semi-circular, whereby on mating, said elements form a circular collar surrounding said band, wherein said aperture is circular in shape, wherein said means for pushing the opened band through siad collar comprises a plunger disc having a plurality of tabs extending radially outward at the edges of said disc, and wherein said apparatus includes means for conveying said articles first to their banding station, and after being banded to means for shrinking said band.

10. Apparatus as in claim 1, capable of performing multi-line banding operations, comprising:
   1. a plurality of band cutting assemblies, comprising said means for dispensing, opening, feeding and cutting said tubing into bands,
   2. a plurality of banding stations equal to the number of cutting assemblies, comprising said means for stopping and for pushing said bands over said articles, and 3. said rotatable plate for moving said bands from said cutting assemblies to said banding stations, provided with a plurality of sets, equal to the number of cutting assemblies, of concentrically located slots.

* * * * *